United States Patent [19]
Ward

[11] Patent Number: 5,327,727
[45] Date of Patent: Jul. 12, 1994

[54] MICRO-GROOVED HEAT TRANSFER COMBUSTOR WALL

[75] Inventor: Steven D. Ward, Cincinnati, Ohio

[73] Assignee: General Electric Company, Cincinnati, Ohio

[21] Appl. No.: 42,953

[22] Filed: Apr. 5, 1993

[51] Int. Cl.$^5$ .............................................. F23R 3/16
[52] U.S. Cl. ........................................ 60/757; 60/752
[58] Field of Search ............... 60/752, 753, 755, 757; 431/353, 350; 165/135; 415/914; 416/236 R, 236 A

[56] References Cited

U.S. PATENT DOCUMENTS

| | | | |
|---|---|---|---|
| 2,477,583 | 8/1949 | DeZubay et al. | 60/757 |
| 2,617,255 | 11/1952 | Niehus | 60/757 |
| 2,785,878 | 3/1957 | Conrad | 60/757 |
| 3,398,527 | 8/1968 | Taylor et al. | 60/752 |
| 3,515,499 | 6/1970 | Beer et al. | |
| 3,542,486 | 11/1970 | Kercher | |
| 3,584,972 | 6/1971 | Bratkovich | |
| 3,702,058 | 11/1972 | DeCorso et al. | 60/757 |
| 3,706,203 | 12/1972 | Goldberg et al. | 60/757 |
| 3,865,508 | 2/1975 | Nagler | 416/22 |
| 4,280,792 | 6/1981 | Hartel et al. | |
| 4,446,693 | 5/1984 | Pidcock et al. | 60/757 |
| 4,543,781 | 10/1985 | Rice | 60/755 |
| 4,650,138 | 3/1987 | Grose | 244/130 |
| 4,903,480 | 2/1990 | Lee et al. | |
| 4,930,729 | 6/1990 | Savill | 244/200 |
| 5,117,626 | 6/1992 | North et al. | 60/39.75 |

FOREIGN PATENT DOCUMENTS

| | | |
|---|---|---|
| 1060095 | 2/1967 | United Kingdom . |
| 2074308 | 10/1981 | United Kingdom . |

OTHER PUBLICATIONS

"Drag Measurements on Marine Vehicles With A Riblet Surface Coating", M. C. Gillcrist and L. W. Reidy, Naval Ocean System; Center, San Diego, CA AIAA-/ASME/SAE/ASEE, 25th Joint Propulsion Conference, Jul. 10–12, 1989.

"Riblet Drag Reduction At Flight Conditions", M. J. Walsh and W. L. Sellers, III, and C. B. McGinley, NASA Langley Research Center, Hampton, VA, AIAA 6th Applied Aerodynamics Conference, Jun. 6–8, 1988.

"Principles of Heat Transfer", Third Edition, by Frank Keith, University of Colorado, Intext Educational Publishers, New York, and London, 310–315, (1973).

Primary Examiner—Richard A. Bertsch
Assistant Examiner—Timothy S. Thorpe
Attorney, Agent, or Firm—Jerome C. Squillaro; Nathan D. Herkamp

[57] ABSTRACT

A gas turbine engine hot section combustor liner is provided a non-film cooled portion of a heat transfer wall having a hot surface and a plurality of longitudinally extending micro-grooves disposed in the portion of the wall along the hot surface in a direction parallel to the direction of the hot gas flow. The depth of the micro-grooves is very small and on the order of magnitude of a predetermined laminar sublayer of a turbulent boundary layer. The micro-grooves are sized so as to inhibit heat transfer from the hot gas flow to the hot surface of the wall while reducing NOx emissions of the combustor relative to an otherwise similar combustor having a liner wall portion including film cooling apertures. In one embodiment the micro-grooves are about 0.001 inches deep and have a preferred depth range of from about 0.001 inches to 0.005 inches and which are square, rectangular, or triangular in cross-section and the micro-grooves are spaced about one width apart.

8 Claims, 4 Drawing Sheets

MICRO-GROOVED HEAT TRANSFER COMBUSTOR WALL

The Government has rights in this invention pursuant to Contract. No. NAS-26071 awarded by NASA.

RELATED PATENT APPLICATIONS

The present Application deals with related subject matter in co-pending U.S. patent application Ser. No. 7/733,892, entitled "FILM COOLING OF JET ENGINE COMPONENTS", by Ching-Pang Lee et al, filed Jul. 22, 1991, assigned to the present Assignee, having two inventors in common with the present application.

The present Application deals with related subject matter in co-pending U.S. patent application Ser. No. 08/043,167, entitled "MICRO-GROOVED HEAT TRANSFER WALL", by Ching-Pang Lee et al, filed Apr. 5, 1993, assigned to the present Assignee.

BACKGROUND OF THE INVENTION

1. Field of the Invention

This invention relates to cooling of components having non-film cooled hot surfaces for disposal and use in a hot flowpath, and more particularly to, combustor liners having non-film cooled hot surfaces.

2. Description of Related Art

It is well known to cool parts using heat transfer across walls having hot and cold surfaces by flowing a cooling fluid in contact with the cold surface to remove the heat transferred across from the hot surface. Among the various cooling techniques presently used are convection, impingement, and film cooling. These cooling techniques have been used to cool gas turbine engine hot section components such as turbine vanes and blades and combustor liners. Film cooling has been shown to be very effective but requires a great deal of fluid flow which typically requires the use of power and is therefore generally looked upon as fuel efficiency and power penalty in the gas turbine industry.

Cooling methods that pass cooling air through the combustor liner have been found to be detrimental to the control of NOx emissions. Designers of low NOx emission combustors seek to eliminate or minimize the amount of cooling air introduced into the combustion zone, thus discarding the high efficiency film cooling methods. Therefore, it is highly desirable to cool the combustor liner using convective and/or impingement cooling which are not as effective in reducing liner temperature.

Another drawback to film cooling is the degree of complexity in fabricating and machining the components. In the past slot film cooling and more recently angled multi-hole film cooling techniques have been developed for particular use in combustor liners. Turbine airfoils on both blades and vanes often incorporate film cooling holes to flow cooling air along the hot surfaces of the airfoil walls. Film cooling slots and angled holes require a great deal of fabrication and or machining. The wall structures themselves are weakened by the cooling airflow passages required to flow the cooling air from the cold to the hot surfaces.

The present invention was developed to improve non-film cooling techniques for gas turbine engine combustor liners so as to efficiently cool the liners without resorting to film cooling and the drawbacks discussed above that are associated with such techniques.

SUMMARY OF THE INVENTION

According to the present invention, a longitudinally extending non-film cooled hot surface of a heat transfer wall of a combustor liner for use in a hot gas flowpath having a predetermined flowpath direction is provided with longitudinally extending micro-grooves in the direction of the flowpath. Typically, micro-grooves are about 0.001 inches deep and have a preferred depth range of from about 0.001 inches to 0.005 inches and are square in cross-section, though rectangular, triangular, and other shapes are contemplated by the present invention for other particular applications and embodiments, and the grooves are spaced about one width apart. One particular embodiment provides a non-film cooled combustor liner with a plurality of transversely disposed micro-grooves that extend longitudinally in a generally hot gas airflow downstream direction on the hot surface of the liner wall.

ADVANTAGES

The present invention provides a non-film cooled combustor liner with longitudinally extending micro-grooves on the hot surface of the liner for exposure to a hot gas flow having a generally longitudinal flowpath direction which improves the boundary layer insulation of the hot surface. The depth of the micro-grooves is very small and on the order of magnitude of a predetermined laminar sublayer of a turbulent boundary layer which can be determined using well known empirical, semi-empirical, and analytical techniques. The advantage of such a micro-grooved hot surface is that it eliminates the need for expensive power consuming and sometimes undesirable film cooling holes in certain gas turbine engine hot section components. The present invention reduces the heat input into the heat transfer wall. The present invention has the advantage of providing a heat transfer surface for a combustor liner that is more effective in reducing NOx emissions and is more effectively insulated by the boundary layer. Therefore the liner of the present invention requires less power to supply cooling air than would otherwise be needed to cool a film cooled combustor liner which has a pressure drop across the liner.

The foregoing, and other features and advantages of the present invention, will become more apparent in the light of the following description and accompanying drawings.

BRIEF DESCRIPTION OF THE DRAWINGS

The foregoing aspects and other features of the invention are explained in the following description, taken in connection with the accompanying drawings where:

FIG. 5 is a cross-sectional view of the micro-grooved wall in FIG. 2 with the riblet having a rectangular cross-section in accordance with an alternative embodiment of the present invention..

FIG. 6 is a cross-sectional view of the micro-grooved wall in FIG. 2 with the riblet having a thin rectangular cross-section in accordance with an alternative embodiment of the present invention.

FIG. 7 is a cross-sectional view of the micro-grooved wall in FIG. 2 with the riblet having a triangular cross-section in accordance with an alternative embodiment of the present invention.

DETAILED DESCRIPTION OF THE INVENTION

Figure 1:
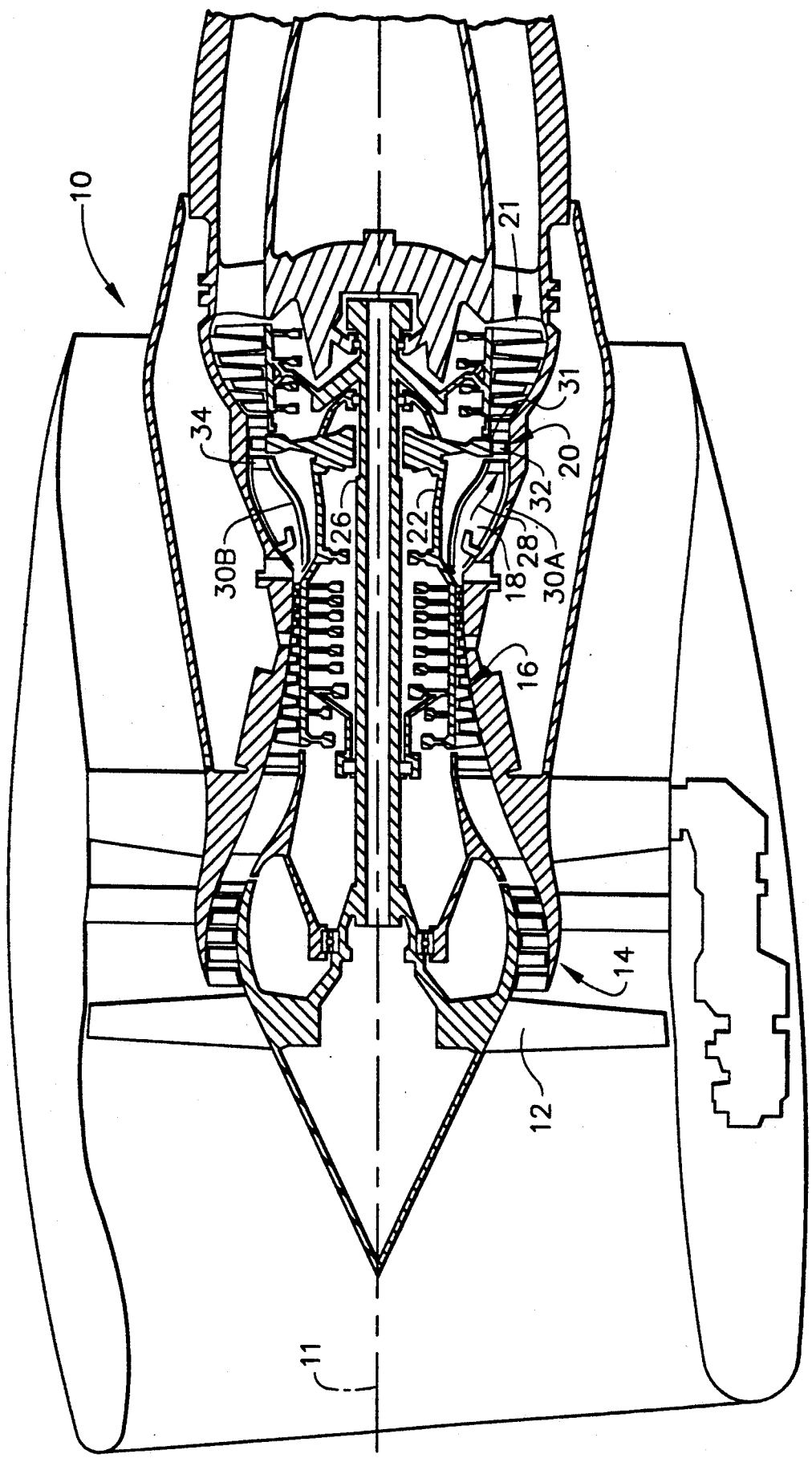
FIG. 1 is a cross-sectional view of a gas turbine engine turbine having non-film air cooled combustor liner with micro-grooved hot surfaces in accordance with the present invention.

Illustrated in FIG. 1 is a gas turbine engine 10 circumferentially disposed about an engine centerline 11 and having in serial flow relationship a fan section indicated by fan blades 12, a low pressure compressor 14, a high pressure compressor 16, a combustion section 18, a high pressure turbine 20, and a low pressure turbine 21. The combustion section 18, high pressure turbine 20, and low pressure turbine 21 are often referred to as the hot section of the engine 10. A high pressure rotor shaft 22 connects, in driving relationship, the high pressure turbine 20 to the high pressure compressor 16 and a low pressure rotor shaft 26 drivingly connects the low pressure turbine 21 to the low pressure compressor 14 and the fan blades 12. Fuel is burned in the combustion section 18 producing a very hot gas flow 28 which is flowed to the high pressure and low pressure turbines 20 and 21 respectively to power the engine 10. Exposed to the hot gas flow 28 are annular inner and outer micro-grooved combustor liners 30B and 30A, respectively in the combustion section 18 and turbine blades 31, as shown on the high pressure turbine 20, having externally micro-grooved hot surfaces on leading edges (shown in more particularity in FIG. 3) in accordance with the present invention. Other hot section components may also make use of the micro-grooved surfaces of the present invention (i.e. turbine vanes such as a turbine inlet guide vane 34). Micro-grooves 37 in hot surfaces 36 longitudinally extend downstream in the direction of and parallel to the predetermined direction of the hot gas flow 28 as indicated by its arrow.

Figure 2:
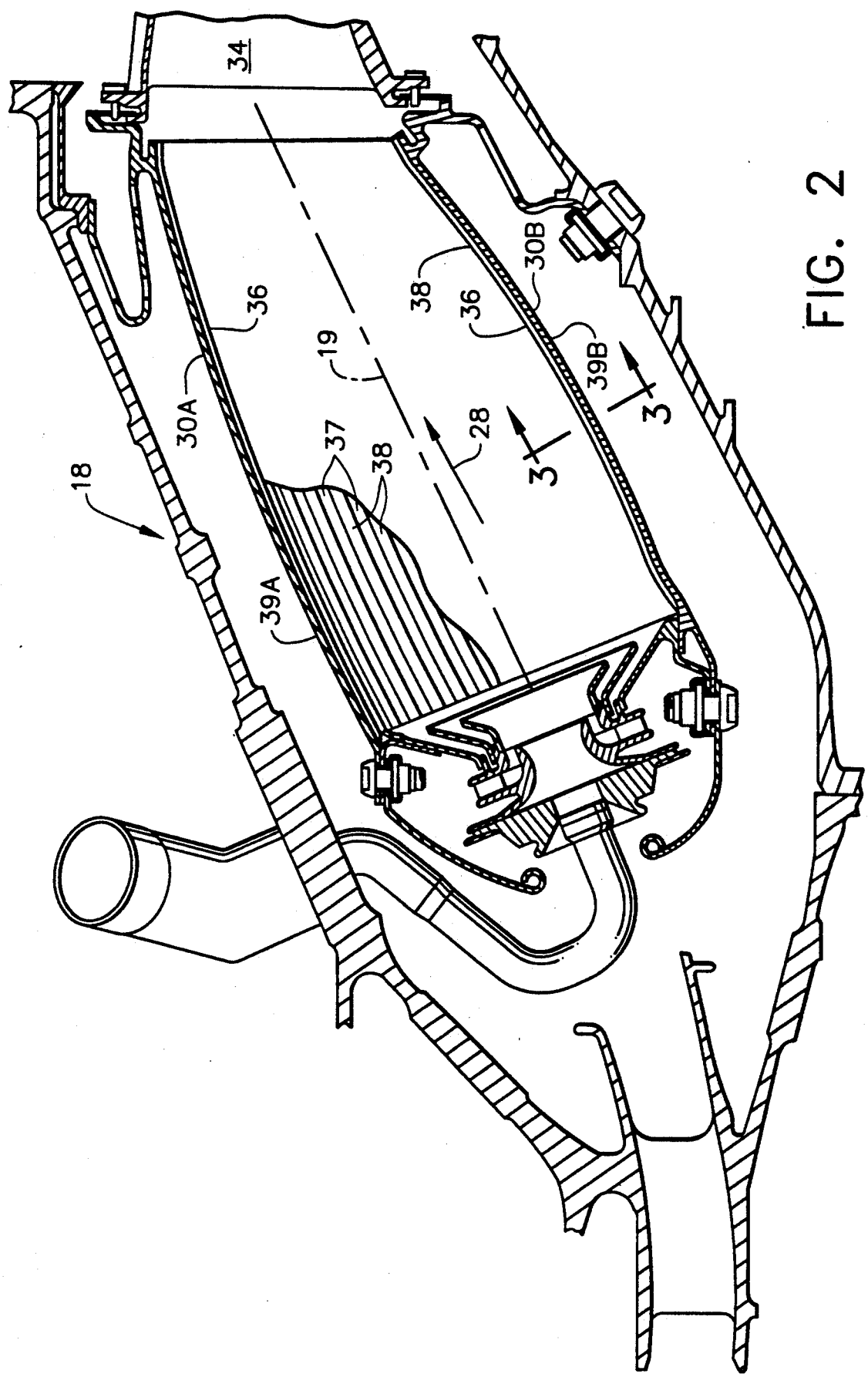
FIG. 2 is an enlarged perspective view of the combustor liner illustrated in FIG. 1.

FIG. 2 illustrates the combustion section 18 and inner and outer combustor liners 30B and 30A, respectively having a hot surface 36 exposed to the hot gas flow 28. Micro-grooves 37 in hot surfaces 36 form riblets 38 that are illustrated in more detail in FIG. 4. Note that the micro-grooved hot surface 36 is not film cooled as denoted by lack of any film cooling apertures or passages from the outer liner cold side 39A and inner liner cold side 39B of the inner and outer combustor liners 30B and 30A, respectively. Combustor 18 includes a longitudinal cross-sectional shape having a longitudinally extending centerline 19 disposed midway between the inner and outer lines 30B and 30A. Micro-grooves 37 in hot surfaces 36 longitudinally extend downstream in a direction which is substantially parallel to centerline 19 and which is therefore also substantially parallel to the predetermined direction of the hot gas flow 28 as indicated by its arrow.

Figure 3:
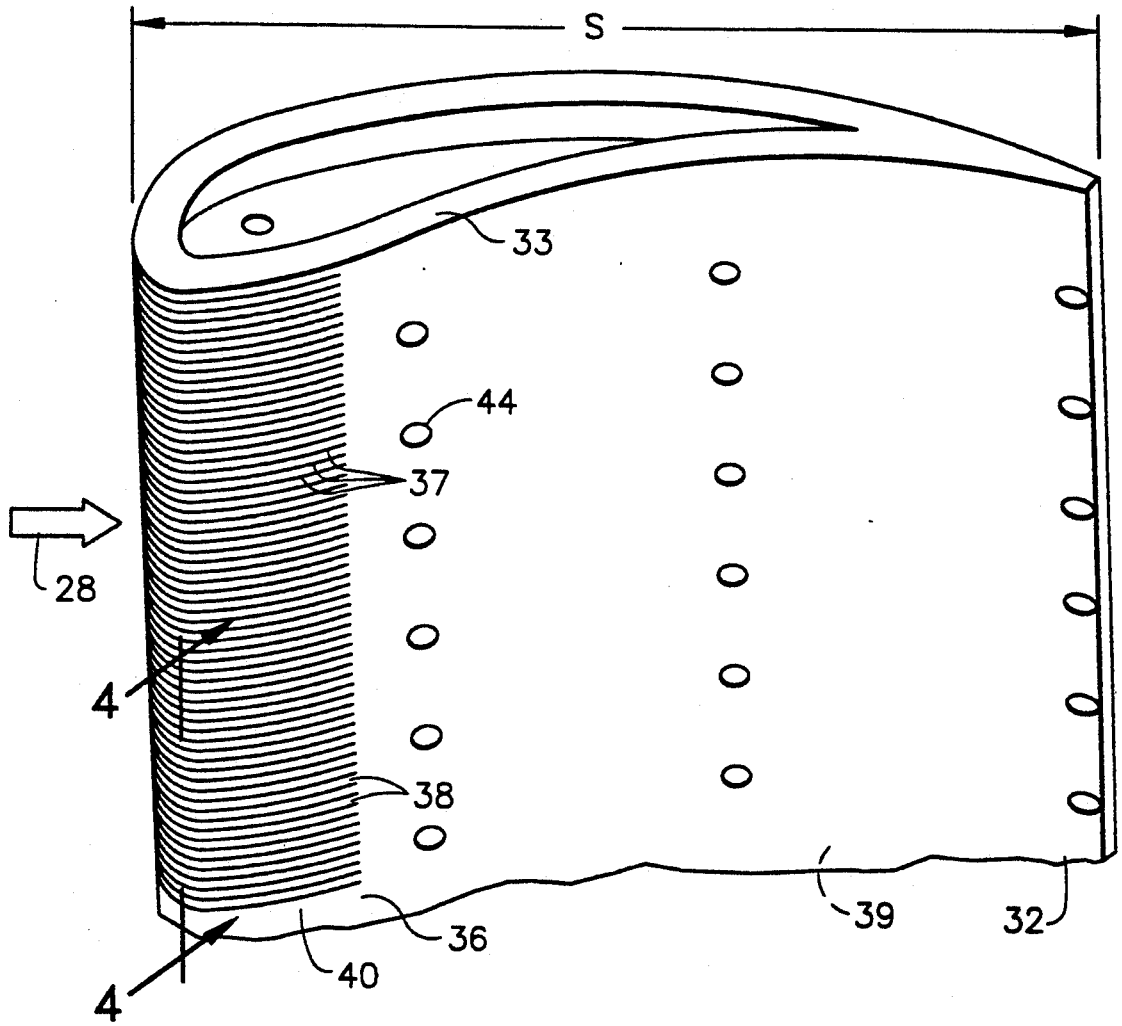
FIG. 3 is an enlarged perspective view of the turbine vane airfoil illustrated in FIG. 1.

FIG. 3 illustrates the airfoil 32 having an airfoil wall 33 including a hot surface 36 exposed to the hot gas flow 28. The hot surface 36 has micro-grooves 37 disposed over a portion of the airfoil 32 covering a leading edge 40 of the airfoil. Micro-grooves 37 in hot surfaces 36 longitudinally extend downstream in the direction of and parallel to the predetermined direction of the hot gas flow 28 as indicated by its arrow. One particular embodiment provides a turbine airfoil with micro-grooves 37 disposed radially apart and that extend longitudinally in a generally chardwise direction S over the leading edge 40 portion of the hot surface 36 of the airfoil wall. Micro-grooves 37 in hot surfaces 36 form riblets 38 that are illustrated in more detail in FIG. 4. Note that the micro-grooved hot surface 36 is not film cooled as denoted by lack of any film cooling apertures or passages from a cold side 39 of the airfoil wall 33 to its hot surface 36. The present invention does contemplate the use of film cooling holes 44 downstream of the leading edge 40.

Figure 4:
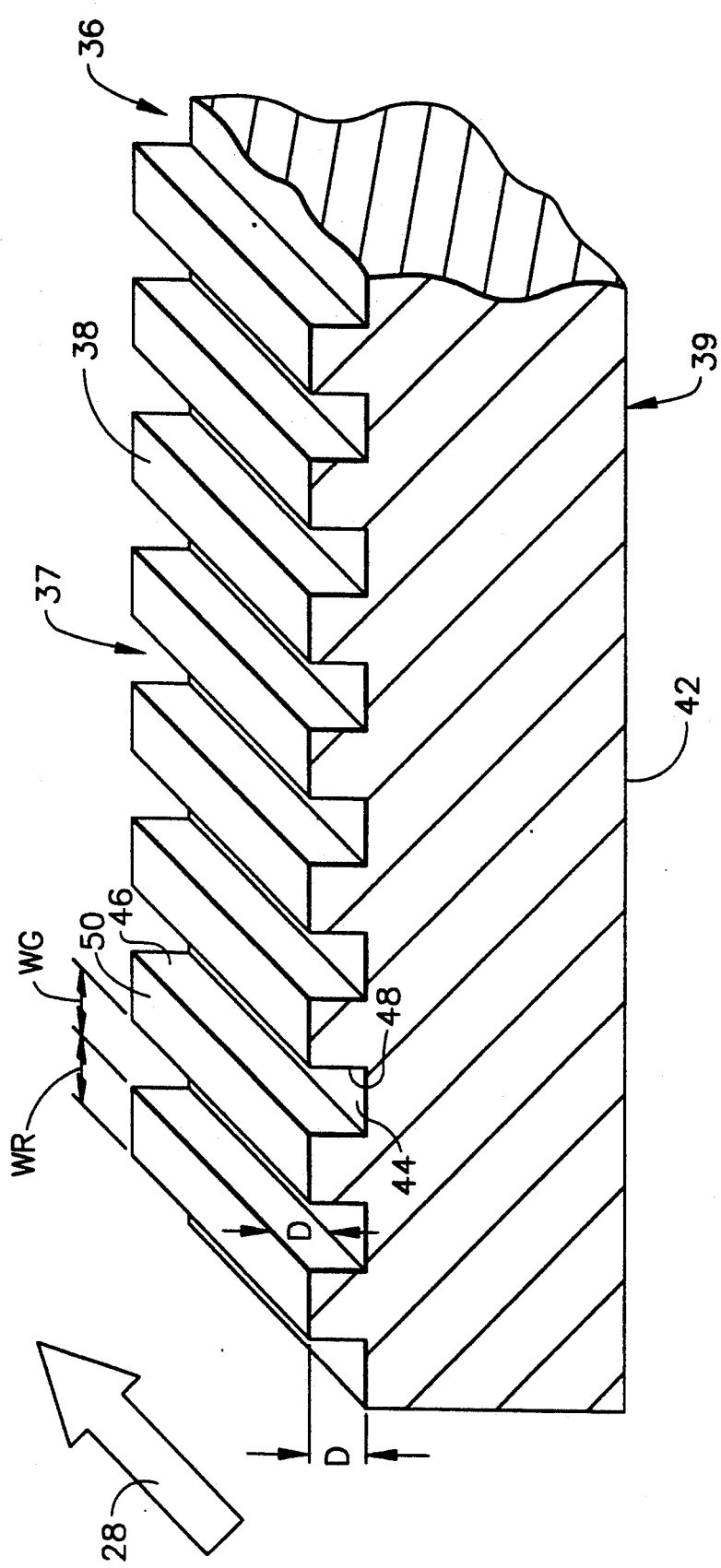
FIG. 4 is a perspective view of a portion of the heat transfer wall in FIG. 2 having a micro-grooved hot surface in accordance with the present invention.

Illustrated in FIG. 4 is a portion of a heat transfer wall 42 representative of the inner and outer micro-grooved combustor liners 30B and 30A, respectively in FIG. 2 and the airfoil wall 33 in FIG. 3. One major purpose of the invention is to inhibit heat transfer from the hot gas flow 28 to the hot surface 36 of the heat transfer wall 42. This is accomplished by etching a series of very tiny micro-grooves 37, along the hot surface 36 in the heat transfer wall 42 in a direction substantially parallel to centerline 19 thereby forming the riblets 38 between the micro-grooves. The size of the micro-grooves 37 is very small and on the order of magnitude of the predetermined localized thickness of the laminar sublayer of the turbulent boundary layer which can be determined using well known empirical, semi-empirical, and analytical techniques. The square micro-grooves 37 and the riblets 38 between the micro-grooves have an optimal micro-groove width WG equal to a riblet width WR and an optimal micro-groove depth D (equal to the height of the riblet 38) depending on the application. Depth D is defined as the distance between an innermost portion 44 of micro-groove 37 and an outermost portion 50 of adjacent one of riblets 38 as measured in a direction which is substantially perpendicular to a plane 52 which passes through the outermost portion 50 of an adjacent pair of riblets 38 located on either side of micro-groove 37. Due to the perspective nature of FIG. 4 plane 52 is not shown in FIG. 4 for purposes of clarity but is shown in the embodiments of the present invention illustrated in FIGS. 5-7. Width WG is defined as the greatest distance between opposing sidewalls 46 and 48 of micro-groove 37 as measured in a direction which is substantially perpendicular to the direction along which depth D is measured and substantially parallel to plane 52. Opposing sidewalls 46 and 48 are substantially parallel to one another in the embodiments illustrated in FIG. 4-6 but are not parallel in the subsequently discussed embodiment illustrated in FIG. 7. Consequently, the distance between sidewalls 46 and 48 is substantially constant in the embodiments illustrated in FIGS. 4-6 but varies in the embodiments illustrated in FIG. 7. For Reynolds numbers typically found in combustors and turbines of gas turbine engines micro-grooves having a depth D and a micro-groove width WG on an order magnitude of about 0.001 inches are preferred with a preferred range of between 0.001 inches to 0.005 inches.

A turbulent boundary layer generally contains eddies and vortexes which destroy the laminar regularity of the boundary-layer motion. Quasi-laminar motion persists only in a thin layer in the immediate vicinity of the surface. This portion of a generally turbulent boundary layer is called the laminar sublayer. The region between the laminar sublayer and completely turbulent portion of the boundary layer is called the buffer layer. More information on the subject may be found in one book entitled "Principles of Heat Transfer, Third Edition", by Frank Kreith published by Intext Educational Publishers in 1973, and more particularly in chapter 6-3 entitled "Boundary-Layer Fundamentals".

The combination of the air in the micro-grooves 37 and the presence of the riblets 38 act to suppress interactions in the boundary layer that would otherwise form turbulent bursts which is a mechanism that enhances heat transfer across a flow. The suppression by the present invention effectively reduces the convective heat transfer coefficient, and thus, the heat input to the heat transfer wall 42 by a proportional amount. The present invention contemplates the use of this concept for hot gas turbine engine components such as for use in turbine blades and vanes. The micro-grooves 37 can be etched into the heat transfer wall 42 by several methods, such as using an Eximer laser, chemical etching, electro-chemical machining (ECM), or electro-discharge machining (EDM), depending on the material of the heat transfer wall.

The invention also contemplates micro-groove cross-sections other than the square shape shown in FIG. 4. Illustrated in FIGS. 5 through 7 are three alternative micro-groove 37 cross-sections for use on a portion of a heat transfer wall 42. FIG. 5 illustrates a rectangular riblet 38 and a rectangular micro-groove 37 having a micro-groove width WG equal to the riblet width WR and both of which are smaller than, i.e. about half, the micro-groove depth D. FIG. 6 illustrates a thin rectangular riblet 38 and a rectangular micro-groove 37 having a micro-groove width WG larger than the corresponding riblet width WR, i.e. about five times as large. FIG. 7 illustrates a triangular riblet 38 and a triangular micro-groove 37 having a micro-groove width WG between the tips, or outermost portions 50, of the triangular riblets 38 larger than, i.e. about twice, the micro-groove depth D. Various embodiments of the present invention provide a means for reducing NOx emissions of combustor 18 and for inhibiting heat transfer from the hot gas flow 28 to wall 42 with the means for reducing and inhibiting comprising a portion of wall 42 which is devoid of film cooling apertures, wherein the hot surface 36 of wall 42 is operable for exposure to the hot gas flow 28. The means for reducing and inhibiting further comprises the plurality of longitudinally extending micro-grooves 37 etched in the portion of wall 42 along hot surface 36 in a direction substantially parallel to centerline 19 of the cross-sectional shape of combustor 18. Micro-grooves 37 are sized s as to inhibit heat transfer from the hot gas flow 28 to hot surface 36 of wall 42 while reducing NOx emissions of combustor 18 relative to an otherwise similar combustor having a liner wall portion which includes film cooling apertures for directing cooling air into the otherwise similar combustor.

While the preferred and an alternate embodiment of the present invention has been described fully in order to explain its principles, it is understood that various modifications or alterations may be made to the preferred embodiment without departing from the scope of the invention as set forth in the appended claims.

We claim:

1. A combustor for use in a gas turbine engine comprising:
   an annular inner liner;
   an annular outer liner, said inner liner and said outer liner being operable to be disposed in a hot gas flow of said engine flowing through said combustor, wherein at least one of said inner and outer liners comprises a heat transfer wall;
   a longitudinal cross-sectional shape having a longitudinally extending centerline disposed midway between said inner and outer liners;
   means for reducing NOx emissions of said combustor and for inhibiting heat transfer from the hot gas flow to said wall, said means for reducing and inhibiting comprising:
      a portion of said wall which is devoid of film cooling apertures, said portion having a hot surface operable for exposure to the hot gas flow; and
      a plurality of longitudinally extending grooves etched in said portion along said hot surface in a first direction substantially parallel to said centerline;
   wherein said grooves are sized so as to inhibit heat transfer from the hot gas flow to said hot surface of said wall while reducing NOx emissions of said combustor relative to an otherwise similar combustor having a liner wall portion which includes film cooling apertures for directing cooling air into the otherwise similar combustor,
   wherein said grooves form a plurality of longitudinally extending riblets, each of said riblets being disposed between an adjacent pair of said grooves;
   wherein said grooves have a depth and a width on the order of magnitude of a predetermined thickness of a laminar sublayer of a turbulent boundary layer along said combustor liner, said depth being defined as the distance between an innermost portion of said groove and an outermost portion of an adjacent one of said riblets as measured in a second direction which is substantially perpendicular to a plane passing through said outermost portion of an adjacent pair of said riblets, said width being defined as the greatest distance between opposing sidewalls of said groove as measured in a third direction which is substantially perpendicular to said second direction and which is substantially parallel to said plane.

2. A combustor as claimed in claim 1 wherein each of said riblets has a lateral cross-sectional shape from a group of shapes, said group of shapes consisting of square, rectangular, and triangular shapes.

3. A combustor for use in a gas turbine engine comprising:
   an annular inner liner;
   an annular outer liner, said inner liner and said outer liner being operable to be disposed in a hot gas flow of said engine flowing through said combustor, wherein at least one of said inner and outer liners comprises a heat transfer wall;
   a longitudinal cross-sectional shape having a longitudinally extending centerline disposed midway between said inner and outer liners;
   means for reducing NOx emissions of said combustor and for inhibiting heat transfer from the hot gas flow to said wall, said means for reducing and inhibiting comprising:
      a portion of said wall which is devoid of film cooling apertures, said portion having a hot surface operable for exposure to the hot gas flow; and
      a plurality of longitudinally extending grooves etched in said portion along said hot surface in a first direction substantially parallel to said centerline;

wherein said grooves are sized so as to inhibit heat transfer from the hot gas flow to said hot surface of said wall while reducing NOx emissions of said combustor relative to an otherwise similar combustor having a liner wall portion which includes film cooling apertures for directing cooling air into the otherwise similar combustor;

wherein said grooves form a plurality of longitudinally extending riblets, each of said riblets being disposed between an adjacent pair of said grooves;

wherein said grooves have a depth and a width in a range of between about 0.001 inches and 0.005 inches, said depth being defined as the distance between and innermost portion of said groove and an outermost portion of an adjacent one of said riblets as measured in a second direction which is substantially perpendicular to a plane passing through said outermost portion of an adjacent pair of said riblets, said width being defined as the greatest distance between opposing sidewalls of said grooves as measured in a third direction which is substantially perpendicular to said second direction and which is substantially parallel to said plane.

4. A combustor as claimed in claim 3 wherein each of said riblets has a lateral cross-sectional shape from a group of shapes, said group of shapes consisting of square, rectangular, and triangular shapes.

5. A combustor for use in a gas turbine engine comprising:

an annular inner liner;

an annular outer liner, said inner liner and said outer liner being operable to be disposed in a hot gas flow of said engine flowing through said combustor, wherein at least one of said inner and outer liners comprises a heat transfer wall;

a longitudinal cross-sectional shape having a longitudinally extending centerline disposed midway between said inner and outer liners;

means for reducing NOx emissions of said combustor and for inhibiting heat transfer from the hot gas flow to said wall, said means for reducing and inhibiting comprising:

a portion of said wall which is devoid of film cooling apertures, said portion having a hot surface operable for exposure to the hot gas flow; and a plurality of longitudinally extending grooves etched in said portion along said hot surface in a first direction substantially parallel to said centerline;

wherein said groove are sized so as to inhibit heat transfer from the hot gas flow to said hot surface of said wall while reducing NOx emissions of said combustor relative to an otherwise similar combustor having a liner wall portion which includes film cooling apertures for directing cooling air into the otherwise similar combustor, wherein said grooves form a plurality of longitudinally extending riblets, each of said riblets being disposed between an adjacent pair of said grooves;

wherein said grooves have a depth and a width of about 0.001 inches, said depth being defined as the distance between an innermost portion of said grooves and an outermost portion of an adjacent one of said riblets as measured in a second direction which is substantially perpendicular to a plane passing through said outermost portion of an adjacent pair of said riblets, said width being defined as the greatest distance between opposing sidewalls of said groove as measured in a third direction which is substantially perpendicular to said second direction and which is substantially parallel to said plane.

6. A combustor as claimed in claim 5 wherein each of said riblets has a lateral cross-sectional shape from a group of shapes, said group of shapes consisting of square, rectangular, and triangular shapes.

7. A combustor for use in a gas turbine engine comprising:

an annular inner liner;

an annular outer liner, said inner liner and said outer liner being operable to be disposed in a hot gas flow of said engine flowing through said combustor, wherein at least one of said inner and outer liners comprises a heat transfer wall;

a longitudinal cross-sectional shape having a longitudinally extending centerline disposed midway between said inner and outer liners;

means for reducing NOx emissions of said combustor and for inhibiting heat transfer from the hot gas flow to said wall, said means for reducing and inhibiting comprising:

a portion of said wall which is devoid of film cooling apertures, said portion having a hot surface operable for exposure to the hot gas flow; and a plurality of longitudinally extending grooves etches in said portion along said hot surface in a first direction substantially parallel to said centerline;

wherein said grooves are sized so as to inhibit heat transfer from the hot gas flow to said hot surface of said wall while reducing NOx emissions of said combustor relative to an otherwise similar combustor having a liner wall portion which includes film cooling apertures for directing cooling air into the otherwise similar combustor, wherein said grooves form a plurality of longitudinally extending riblets, each of said riblets being disposed between an adjacent pair of said grooves;

wherein said grooves have a depth and a width in a range of between about 0.001 inches and 0.005 inches, said depth being defined as the distance between an innermost portion of said groove and an outermost portion of an adjacent one of said riblets as measured in a second direction which is substantially perpendicular to a plane passing through said outermost portion of an adjacent pair of said riblets, said width being defined as the greatest distance between opposing sidewalls of said groove as measured in a third direction which is substantially perpendicular to said second direction and which is substantially parallel to said plane, and wherein said grooves are spaced apart along said hot surface in said third direction by said width.

8. A combustor as claimed in claim 7 wherein each of said riblets has a lateral cross-sectional shape from a group of shapes, said group of shapes consisting of square, rectangular, and triangular shapes.

* * * * *